United States Patent [19]

Christen et al.

[11] Patent Number: 4,804,544

[45] Date of Patent: Feb. 14, 1989

[54] CHEWING GUM WITH BISCUIT-LIKE TEXTURE

[75] Inventors: Felix Christen, Zurich; Fritz Kracher, Guntershausen, both of Switzerland

[73] Assignee: Givaudan Corporation, Clifton, N.J.

[21] Appl. No.: 886,451

[22] Filed: Jul. 15, 1986

[30] Foreign Application Priority Data

Jul. 24, 1985 [CH] Switzerland ............ 3205/85
May 26, 1986 [CH] Switzerland ............ 2112/86

[51] Int. Cl.$^4$ ............................ A23G 3/30
[52] U.S. Cl. ........................ 426/5; 426/445; 426/548
[58] Field of Search .................. 426/3-6, 426/548, 445

[56] References Cited

U.S. PATENT DOCUMENTS

| | | | |
|---|---|---|---|
| 3,020,164 | 2/1962 | Forkner | 426/5 |
| 3,912,817 | 10/1975 | Sapsowitz | 426/5 |
| 4,604,287 | 8/1986 | Glass et al. | 426/5 |

FOREIGN PATENT DOCUMENTS

| | | | |
|---|---|---|---|
| 34977 | 7/1982 | Japan | 426/3 |
| 34978 | 7/1982 | Japan | 426/3 |
| 1067445 | 4/1986 | Japan | 426/3 |

OTHER PUBLICATIONS

Rompps Chemielexikon, 8th Edition, 2 (1981) 919.
H. W. Ockerman, "Source Book for Food Scientists", AVI Publishing Co. Inc., 1978, pp. 89, 832.
G. G. Birch et al., ed., "Nutritive Sweetners", Applied Science Publishers, N.J. (1982) pp. 67–81.
Ullmanns Encyklopaedie der Technischen Chemie, Verlagchemie, Weinheim, 1982, 4th Edition 22, pp. 353–365.
G. Kindel et al., Haarmann and Reimer Contact, No. 30 (1980) pp. 11–13.
Haensel Bericht Fur Geschmackstoffe Verarbeitende Industrien 1 (1981) pp. 1–19.

*Primary Examiner*—Jeanette Hunter
*Attorney, Agent, or Firm*—Robert F. Tavares; Linda A. Vag

[57] ABSTRACT

A baked chewing gum product containing gum base, sweetener, about one percent water or less having a porous, crumbly, breakable, biscuit-like texture obtained by rapidly baking chewing gum pieces at a temperature of from 80° C. to 180° C. to reduce the water content and to produce said texture.

15 Claims, No Drawings

CHEWING GUM WITH BISCUIT-LIKE TEXTURE

This invention is concerned with a novel chewing gum product which is characterized by its novel texture, namely a biscuit-like texture.

The term biscuit-like texture is to be understood to mean that the chewing gum has the appearance of a biscuit, cookie or cracker inasmuch as it is porous, crumbly, breakable and has an aerated appearance and, in most cases, has a type of crust which is usually formed by a baking process. It also has a vast number of minute cavities in the interior. The appearance of the chewing gum product of this invention is therefore completely different from the more or less solid, tough and compact appearance commonly characteristic of known chewing gums.

The chewing of the novel chewing gum product gives as an initial sensation the brittle, crumbly impression expected from the chewing of a biscuit. This initial impression gives way after a few seconds, e.g., 10–40 seconds, to the usual sensation expected upon the chewing of chewing gum.

The novel chewing gum fulfills a need for novel products which are consistent with modern trends in eating habits.

This invention is also concerned with a process for the manufacture of the novel chewing gum which comprises first manufacturing chewing gum in a manner consistent with the usual processes known in the art and then subjecting said gum product to an additional step of heating in a baking-type process.

DESCRIPTION OF THE PREFERRED EMBODIMENTS

The process of this invention involves a first step that is known in the art, i.e., a conventional, pliable chewing mass is first manufactured from the usual ingredients. The ingredients which are usually used in conventional chewing gum manufacture are:

(a) Commercially available chewing gum bases, i.e. natural bases and/or synthetic bases, (b) Sweeteners, namely (1) sugar or sugar substitutes,
such as
cane sugar (saccharose, sucrose), beet sugar (saccharose), grape sugar (glucose), fruit sugar (fructose); powdered sugar; the usual sugar substitutes: these are those mono- oligo- and poly-saccharides or derivatives of such saccharides which are usual in the trade, e.g.: malt sugar (maltose), milk sugar (lactose), galactose, starch hydrolyzates (dextrins, maltodextrins), starch syrup (corn syrup), maltose syrup. (See e.g. Rompps Chemielexikon, 8th Edition, Volume 2 (1981), page 919, H. W. Ockermann, Source Book for Food Scientists, The AVI Publishing Company Inc., (1978), page 89 [dextrin(s) . . . ] or, further, G. G. Birch, K. J. Parker, Nutritive Sweeteners, Applied Science Publishers, London and New Jersey, (1982), page 67 et seq. [Maltose Syrups].) polydextroses (glucose polymers with sorbitol end groups and with citric acid ester bonds, obtainable by melting and condensing glucose, sorbitol and citric acid; Pfizer Inc. Chemical Division, 235 E. 42nd St., New York), or especially also sugar alcohols, e.g. sorbitol, mannitol, xylitol, maltitol, etc. (Sugar alcohols should, however, conveniently be used only in admixture with sugars, advantageously in mixtures of about 1:1.)

(2) synthetic sweeteners, (See e.g. Ullmanns Encyklopaedie der technischen Chemie, 4th Edition, Volume 22, Weinheim, (1982), page 353 et seq.) Particularly, such as, 1,2-Benzisothiazol-3(2H)-one 1,1-dioxide (saccharin), 1,2-benzisothiazol-3(2H)-one 1,1-dioxide Na salt, salts of cyclohexylaminosulphonic acid (cyclamates), e.g. the sodium or calcium salt, α-L-aspartyl-L-phenylalanine methyl ester (aspartame), 6-methyl-1,2,3-oxathiazin-4(3H)-one 2,2-dioxide potassium salt (acesulfame-K).

Synthetic sweeteners are also used especially where the sweetening power of the sugar and/or sugar substitute is noticed as being insufficient. This is the case e.g. with lactose, the maltodextrins, etc.

(c) Plasticizers, softeners, viscous and low viscosity paraffins and microcrystalline waxes, glycerol, emulsifiers, etc., (d) Flavoring substances, (e) If desired, additional adjuvants, e.g. fillers, coloring substances, antioxidants, etc.

The gum is softened by pre-heating usually to about 30° C. to 70° C. The sweetener, plasticizer, flavoring substance and, if desired, additional adjuvants are added while kneading, and the manufacture of the compact chewing mass is carried out in a known manner with further kneading.

In the usual process for preparing gum this mass defined herein as the finished gum mass would now be converted to a particular form and split into portions by means of an apparatus which is common in the chewing gum industry, e.g., an extruder, a band moulding machine, a multiple purpose roller, a cutting roller, etc., which would convert the gum mass into strips (sticks), cubes, squares, bars, cylinders, hollow shapes, granulates, etc. In the present case however, an additional step is added which involves a heat treatment or baking process as was mentioned above.

For additional references describing traditional chewing gum manufacture, see G. Kindel and N. A. Roden, Haarmann & Reimer, Contact (1980), pages 30 et seq.; Haensel, Bericht fur geschmackstoffe verarbeitende Industrien, 1 (1981), pages 1–19; editor: H. Haensel, D-3450 Holzminden.

In producing the novel chewing gum product in accordance with this invention, it is especially preferred that the novel chewing gum contain as the sweetener(s) in a substantial, predominant or even exclusive amount, either (a) a practically non-hygroscopic sweetener, or, (b) a sugar or sugar substitute which is only moderately soluble in water, e.g. a maltodextrin, or lactose.

The term "practically non-hygroscopic" is to be understood to mean that the sweetener in question does not visibly deliquesce or clump upon normal air exposure after a lengthy storage period, for example 48 hours. The term "only moderately soluble in water" is to be understood to mean that the sweetener in question is not soluble in water at room temperature to more than about 50% (W/W).

It is preferred to use the especially preferred sweetener in an amount equal to about 20 to 100% of the total sweetener. It is especially preferred to use this sweetener in an amount equal to about 60 to 100% of the total.

Preferred sweetener combinations are:
lactose/starch syrup
lactose/starch syrup/synthetic sweetener
lactose/synthetic sweetener fructose/maltodextrins
saccharose/starch syrup
saccharose/maltodextrins/synthetic sweetener
glucose/starch syrup
galactose/glucose
galactose/synthetic sweetener
maltodextrins/synthetic sweetener.

It has been found advantageous to use combinations of sweeteners since the use of combinations makes it possible to produce "made-to-order" products based on the different physical and chemical properties of the individual components of the chewing mass. For example the use of combinations of sweeteners makes possible the "regulation" of the desired degree of sweetness in a simple way. For example use of the maltodextrins which are known to vary widely in properties is especially suitable for such purposes. The effects which can be individually achieved by varying the sweetener components and the additional ingredients are well-known to one skilled in the art.

The compact chewing mass thus obtained may be stored for up to 24 hours, or may be immediately preformed and portioned as discussed above. In the present case it is preferred that the chewing mass be first rolled out into thin layers (laminates). The chewing mass can then be portioned for example with slicing apparatus or cutting-out machines (cutters) which are commonly used in the biscuit industry.

The baking process in accordance with the process of the invention can be carried out in conventional baking ovens or in microwave ovens. The temperature of the baking process may range from about 80° C. to about 180° C., especially from about 90° C. to about 150° C.

The suitable temperature range is somewhat sweetener-specific. For a hygroscopic sweetener or a sweetener which has a good solubility in water, low temperatures are preferrable for the baking process. For example, when saccharose and glucose are used as the main sugar components, a temperature of about 80° C. should not substantially be exceeded. On the other hand, in the case of lactose and maltodextrin temperatures of 150° C. are possible.

The baking time may vary from about 5 to 50 minutes. About 15 to 30 minutes is preferred. As is common in the biscuit industry, the suitable baking time usually depends on the water content of the chewing mass.

The water content is usually about 3–3.5% before the baking step. After the baking step the water content should not greatly exceed 1.0%. Preferably the water content should be below 1.0% after the baking step in order to guarantee sufficient stability of the shaped form. This difference in the water content is considered to be an essential reason for the novel biscuit-like texture of the chewing gum of this invention. As mentioned above, conventional chewing gum usually has a water content of about 3–3.5%. The rapid evaporation of the water during the baking process leads to the porous structure which is essential to the invention.

Suitable ranges for use of a microwave oven in the baking step are:
Energy consumption: 800–1300 watts
Time: up to 10 minutes.

If desired, the shaped forms can be provided with a glazed coating, as for example by brushing with a 50% gum arabic solution.

The products can be stored for as long as desired, although the humidity should not be too high.

Chewing gums containing lactose are known. Japanese patent publication No. 34 977 (Lotte K. K.; 26th July 1982) discloses a process in which the basic chewing gum mass is first kneaded at a much higher temperature namely at 100° C.–150° C. The chewing gum subsequently produced has a conventional texture.

Japanese patent publication No. 34 978 (Lotte K. K.; 26th July 1982) also discloses lactose containing chewing gums. This Japanese Publication requires an additional microwave heat treatment of the kneaded mass in order to produce a non-gritty gum.

EXAMPLE 1

A chewing gum mass consists of:

| Component | Percent (%) |
|---|---|
| Lactose | 54 |
| Starch syrup 44° Be (water content about 15%) | 19 |
| Chewing gum base | 23 |
| Cocoa powder | 2 |
| Commercial chocolate flavor | 2 |

The chewing gum base is first pre-heated to 40° C. to 70° C. and in the mixer the other ingredients listed are carefully kneaded-in in the usual manner while maintaining the temperature.

The finished mixed chewing mass can (if desired after storage at room temperature for up to 24 hours) be rolled out into thin layers (laminates) from which shaped forms can be cut out or rolled out by means of, respectively, cutting-out machines ("cutters") or stamping rollers which are usual in the baking industry.

These shaped forms are heated on a baking sheet at 150° C. for 15 minutes in a usual baking oven. After cooling, the shaped forms can be packed.

EXAMPLE 2

A chewing gum mass consists of:

| Component | Percent (%) |
|---|---|
| Saccharose | 54.5 |
| Starch syrup 45° Be | 19.5 |
| Chewing gum base | 24 |
| Commercial vanilla flavor | 2 |

The chewing gum base is pre-heated to 40° C. to 70° C. and in the mixer the other ingredients are carefully kneaded-in in the usual manner while maintaining the temperature.

The finished mixed chewing mass can (if desired after storage at room temperature for up to 24 hours) be rolled out into thin layers (laminates) from which shaped forms can be cut out by means of a rotary cutter.

These shaped forms are heated on a baking sheet at 80° C. for 30 minutes in a usual baking oven. After cooling, the shaped forms can be packed.

EXAMPLE 3

A chewing mass consists of:

| Component | Percent (%) |
|---|---|
| Glucose, anhydrous | 54.5 |
| Starch syrup 44° Be | 19.5 |
| Chewing gum base | 24 |
| Commercial orange flavor | 2.1 |

The chewing gum base is pre-heated to 40° C. to 70° C. and in the mixer the other ingredients listed are carefully kneaded-in in the usual manner while maintaining the temperature.

The finished mixed chewing mass can (if desired after storage at room temperature for up to 24 hours) be rolled out into thin layers (laminates) from which shaped forms can be cut out.

These shaped forms are treated for 4 minutes in a 800 W microwave oven. After cooling, the shaped forms can be packed.

EXAMPLE 4

According to the process of Examples 1 to 3, the chewing gum masses of the following composition lead, after the baking process, to similar results:

| Component | Percent (%) |
|---|---|
| (a) Maltose | 66 |
| Saccharin | 0.2 |
| Water | 3 |
| Glycerol | 5 |
| Base | 24 |
| Flavor | 1.8 |
| (b) Lactose | 66 |
| Aspartame | 0.4 |
| Water | 3 |
| Glycerol | 5 |
| Base | 24 |
| Flavor | 1.6 |
| (c) Saccharose | 66 |
| Aspartame | 0.3 |
| Water | 3 |
| Glycerol | 5 |
| Base | 24 |
| Flavor | 1.7 |
| (d) Galactose | 66 |
| Saccharin | 0.15 |
| Water | 3 |
| Glycerol | 5 |
| Base | 24 |
| Flavor | 1.85 |
| (e) Maltodextrin (low sweetening) | 66 |
| Acesulfame-K | 0.4 |
| Water | 3 |
| Glycerol | 5 |
| Base | 24 |
| Flavor | 1.6 |
| (f) Maltodextrin (high sweetening) | 67 |
| Water | 3 |
| Glycerol | 5 |
| Base | 23 |
| Flavor | 2 |

We claim:

1. A baked chewing gum product comprising a gum base, a sweetener and having a water content which is about one percent or less, said product having a porous, crumbly, breakable biscuit-like texture, an aerated appearance and a vast number of minute cavities in the interior, said chewing gum having been rapidly baked at a temperature of from 80° C. to 180° C. for a period of time sufficient to reduce the water content of said gum product to about one percent or less.

2. A chewing gum according to claim 1 wherein said sweetener is
   (a) a sugar or sugar substitute selected from the group consisting of cane sugar (saccharose, sucrose), beet sugar (saccharose), grape sugar (glucose), fruit sugar (fructose), powdered sugar, mono-, oligo- and poly-saccharides and derivatives thereof as malt sugar (maltose), milk sugar (lactose), galactose, starch hydrolyzates (dextrins, maltodextrins), starch syrup (corn syrup), maltose syrup, polydextroses and sugar alcohols, as sorbitol, mannitol, xylitol, maltitol,
   (b) a synthetic sweetener selected from the group consisting of 1,2-benzisothiazol-3(2H)-one 1,1-dioxide (saccharin), 1,2-benzisothiazol-3(2H)-one 1,1-dioxide sodium salt, α-L-aspartyl-L-phenylalanine methyl ester (aspartame), and 6-methyl-1,2,3-oxathiazin-4(3H)-one 2,2-dioxide potassium salt (acesulfame-K), or,
   (c) a combination thereof.

3. A chewing gum according to claim 2 wherein 20% to 100% of said sweetener is
   (a) a substantially non-hygroscopic sweetener,
   (b) a sweetener which is only moderately soluble in water, or
   (c) a combination thereof.

4. A chewing gum according to claim 3 wherein 20% to 100% of said sweetener is
   (a) a synthetic sweetener selected from the group consisting of 1,2-benzisothiazol-3(2H)-one 1,1-dioxide (saccharin), 1,2-benzisothiazol-3(2H)-one 1,1-dioxide sodium salt, α-L-aspartyl-L-phenylalanine methyl ester (aspartame) and 6-methyl-1,2,3-oxathiazin-4(3H)-one 2,2-dioxide potassium salt (acesulfame-K),
   (b) a sugar or sugar substitute selected from the group consisting of galactose, lactose and maltodextrins, or,
   (c) a combination thereof.

5. A chewing gum according to claim 4 wherein the water content is less than 1%.

6. A chewing gum according to claim 5 wherein said sweetener is lactose.

7. A chewing gum according to claim 5 wherein said sweetener is galactose.

8. A chewing gum according to claim 5 wherein said sweetener is a synthetic sweetener selected from the group consisting of 1,2-benzisothiazol-3(2H)-one 1,1-dioxide (saccharin), 1,2-benzisothiazol-3(2H)-one 1,1-dioxide sodium salt α-L-aspartyl-L-phenylalanine methyl ester (aspartame), and 6-methyl-1,2,3-oxathiazin-4(3H)-one 2,2-dioxide potassium salt (acesulfame-K).

9. A process for preparing a chewing gum product having a porous, crumbly, breakable, biscuit-like texture, an aerated appearance and a vast number of minute cavities in the interior, said process comprising:
   (a) converting a conventional, pliable, finished chewing gum mass into a suitable form for dividing it into smaller portions,
   (b) dividing said chewing gum mass into suitable portions,
   (c) heating said portions via a baking process at a temperature of from 80° C. to 180° C. for a period of from about 5 minutes to 50 minutes to a moisture content of about one percent less, and,
   (d) allowing said portions to cool to ambient temperature.

10. A process according to claim 9 wherein the finished gum mass comprises a gum base and a sweetener.

11. A process according to claim 10 wherein said sweetener is
   (a) a sugar or sugar substitute selected from the group consisting of cane sugar (saccharose, sucrose), beet sugar (saccharose), grape sugar (glucose), fruit sugar (fructose), powdered sugar, mono-, oligo- and poly-saccharides and derivatives thereof as malt sugar (maltose), milk sugar (lactose), galactose, starch hydrolyzates (dextrins, maltodextrins), starch syrup (corn syrup), maltose syrup, polydextroses and sugar alcohols as sorbitol, mannitol, xylitol, maltitol,
(b) a synthetic sweetener selected from the group consisting of 1,2-benzisothiazol-3(2H)-one 1,1-dioxide (saccharin), 1,2-benzisothiazol-3(2H)-one, 1,1-dioxide sodium salt, α-L-aspartyl-L-phenylalanine methyl ester (aspartame), and 6-methyl-1,2,3-oxathiazin-4(3H)-one 2,2-dioxide potassium salt (acesulfame-K), or,
(c) a combination thereof.

12. A process according to claim 11 wherein
(a) the finished gum mass comprises a gum base and a sweetener, said sweetener being from 20% to 100% of
   (i) a substantially non-hygroscopic sweetener, or
   (ii) a sweetener which is moderately soluble in water, or
   (iii) a combination of the above, and
(b) the heating process is carried at 80° C. to 150° C. for a period of 15 to 30 minutes.

13. A process according to claim 12 wherein the sweetener is lactose.

14. A process according to claim 12 wherein the sweetener is galactose.

15. A process according to claim 12 wherein the sweetener is a synthetic sweetener selected from the group consisting of 1,2-benzisothiazol-3(2H)-one 1,1-dioxide (saccharin), 1,2-benzisothiazol-3(2H)-one 1,2-dioxide sodium salt, α-L-aspartyl-L-phenylalanine methyl ester (aspartame), and 6-methyl-1,2,3-oxathiazin-4(3H)-one 2,2-dioxide potassium salt (acesulfame-K).

* * * * *